Sept. 17, 1935.  A. V. SULLIVAN  2,014,706
APPARATUS FOR MAKING CANS
Filed Nov. 10, 1933 5 Sheets-Sheet 2
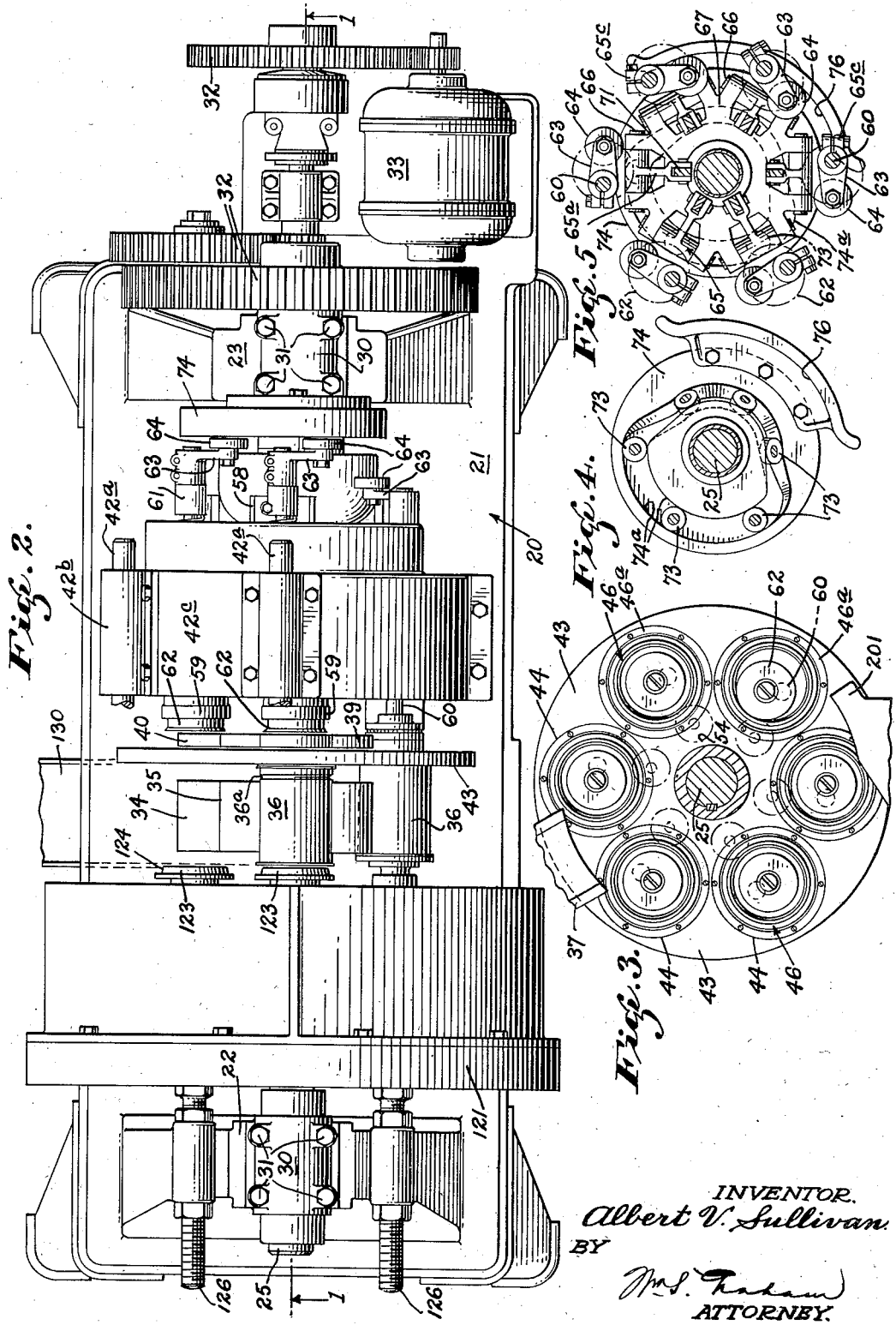
INVENTOR.
Albert V. Sullivan
BY
ATTORNEY.

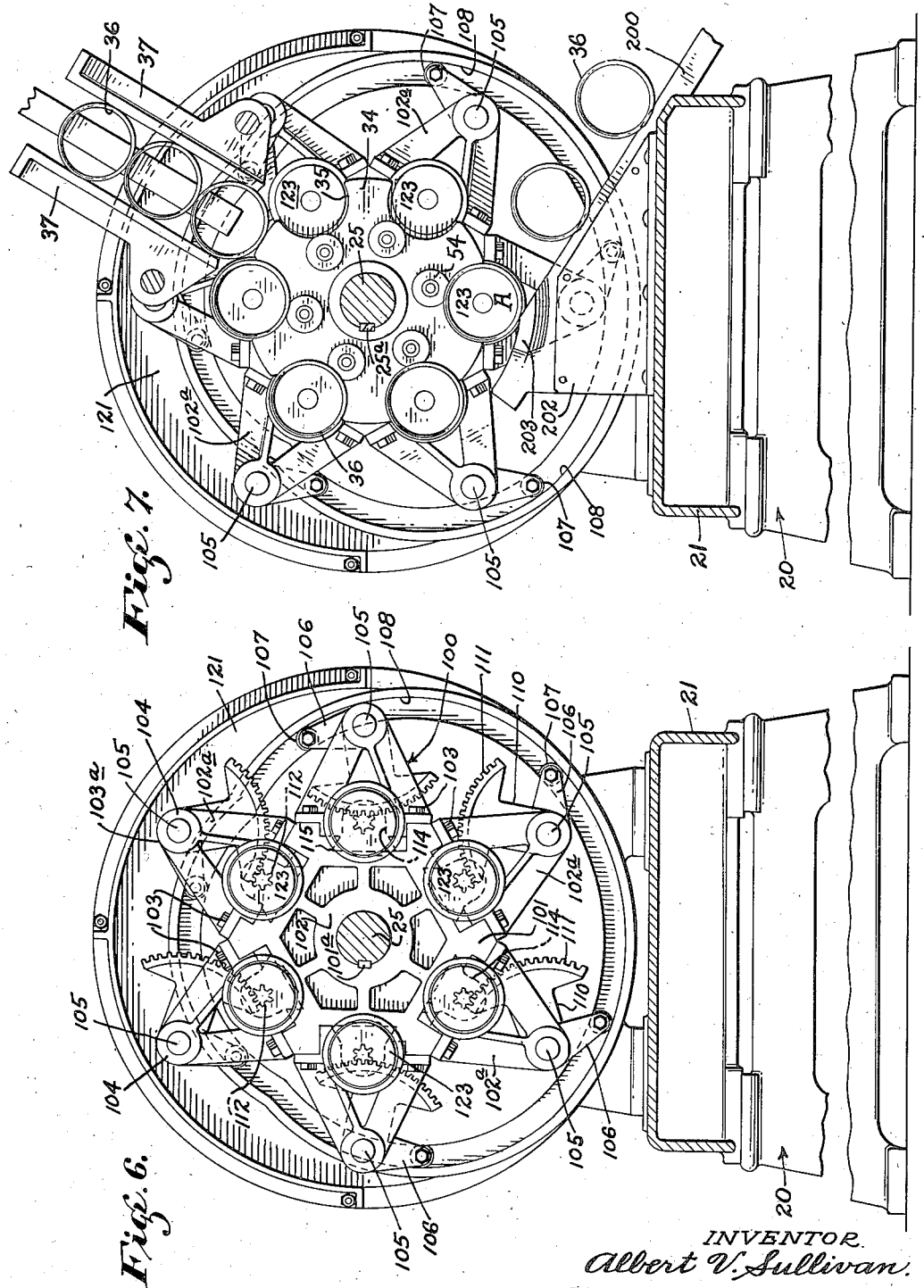

INVENTOR.
Albert V. Sullivan.
BY
ATTORNEY.

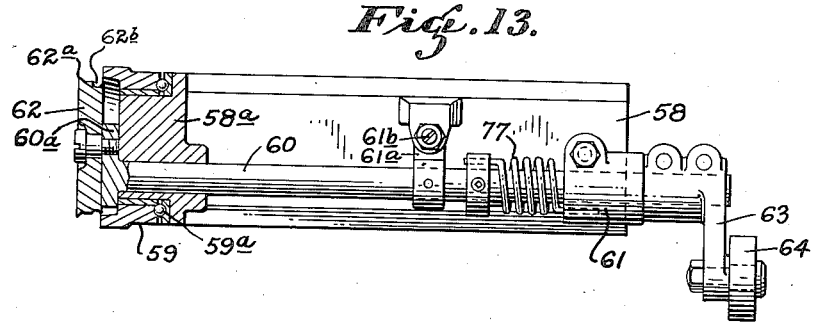
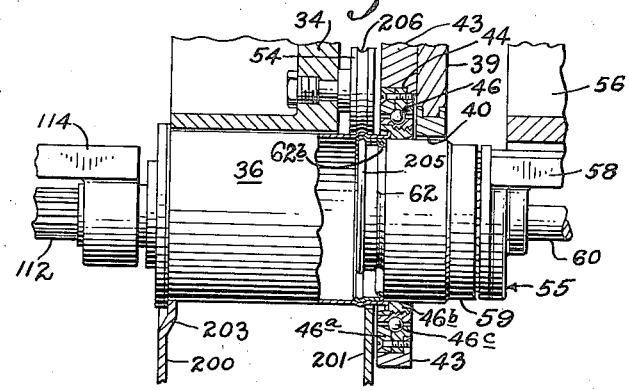
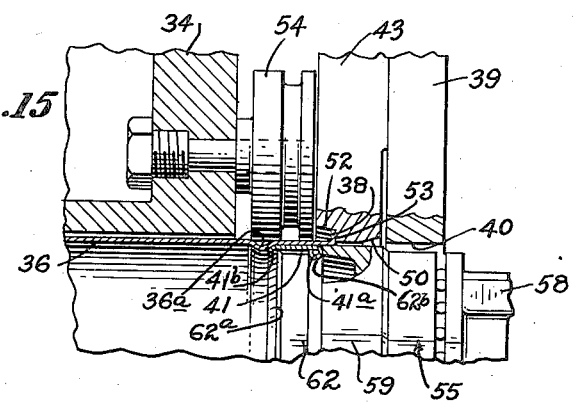

Patented Sept. 17, 1935

2,014,706

UNITED STATES PATENT OFFICE 2,014,706

APPARATUS FOR MAKING CANS

Albert V. Sullivan, Redwood City, Calif., assignor to Pacific Can Company, San Francisco, Calif., a corporation of Nevada Application November 10, 1933, Serial No. 697,432

76 Claims. (Cl. 113—1)

This invention relates generally to apparatus for inserting a collar into a can body and securing said collar in the can body, and more particularly relates to an apparatus for inserting collars in can bodies which are of the tearstrip or ripstrip type of can, and for providing a contact relationship between the collar and can body whereby the collar is fixedly positioned in the can.

Among the objects of this invention are:—

To provide apparatus for inserting collars in can bodies; to provide apparatus for contacting the collar and can body into tightly held relationship; to provide apparatus for inserting and fixedly securing a collar in a can body while the can is being continually advanced; to provide apparatus for inserting a collar in a can body and fixedly securing the collar to the can body simultaneously with the can being continually advanced; to provide apparatus for inserting a collar in a can body and beading the can body while the can is at a single station on a turret, and the can is being continually advanced by the turret; to provide in a can collar inserting machine means to bead the can at the same station at which the collar is inserted; to provide in a can collar inserting and beading machine means for relative rotation of a can body while a can body is at a collar inserting station and being continually advanced; to provide means for inserting a collar in a can body and clinching the collar into the body and rolling down a bead at the outer end of the collar while the can body is at a single station and being continually advanced.

Other objects are generally to improve and simplify apparatus for making can bodies having collars therein.

With the above mentioned and other objects in view, all of which will be more apparent as this description proceeds, the invention is exemplified in one form in the novel construction and combination of parts hereinafter described, illustrated in the accompanying drawings, and pointed out in the claims hereto appended, and in the novel method hereinafter set forth and claimed, it being understood that various changes in the form, proportion, size, and minor details of construction of the apparatus, and changes in the steps of the process, may be resorted to within the scope of the appended claims, without departing from the spirit or sacrificing any of the advantages of the invention. To more clearly comprehend the invention, reference is directed to the accompanying drawings, wherein:—

Fig. 2 is a plan view of the apparatus.

Fig. 3 is a cross-section view on line 3—3 in Fig. 1, showing in detail eccentric operation of spinning head wheel and cooperating rollers.

Fig. 4 is a cross-section view on line 4—4 of Fig. 1, showing in detail eccentric cam for reciprocating the collar inserting plunger and spinning head wheel.

Fig. 5 is a cross-section view on line 5—5 of Fig. 1, showing in detail cam and roller means for eccentrically moving the spinning head wheel.

Fig. 6 is a cross-section view on line 6—6 of Fig. 1, showing eccentric cam and quadrant gears for reciprocating can body and for rotating can during effective operation of the spinning head wheel.

Fig. 7 is a cross-section view on line 7—7 of Fig. 1, showing detail of can turret and chucks for rotating can.

Fig. 13 is a diagrammatic plan of the carriage assembly.

Fig. 14 is a fragmentary view in section of a modification of spinning wheel head and cooperating roller for beading purposes.

Fig. 15 is an enlarged fragmentary detail, partly in section, of position of mechanism during spinning operation on the collar.

Figure 1:
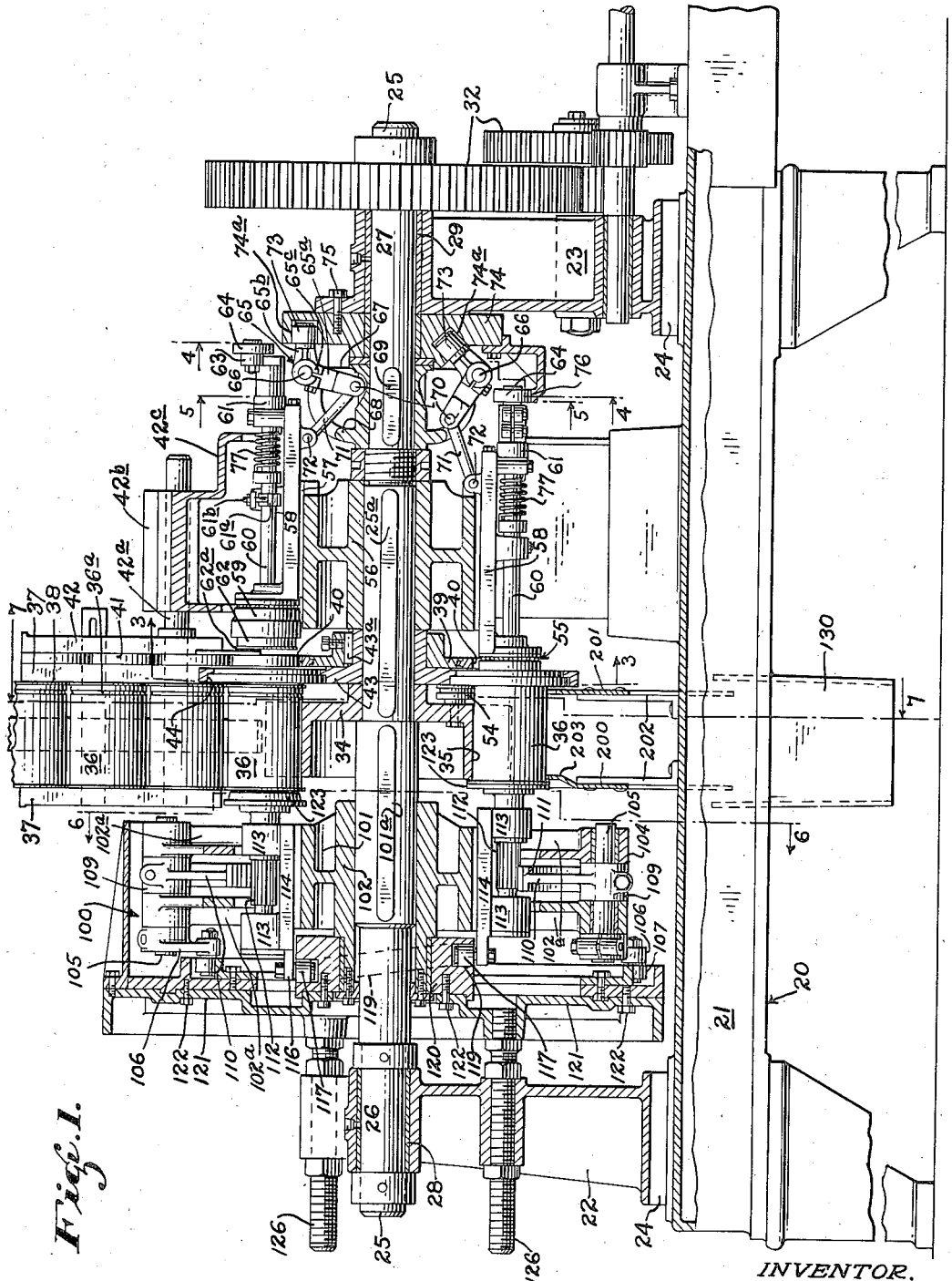
Fig. 1 is a longitudinal side elevation partially cross-sectioned centrally, on line 1—1 of Fig. 2.

Referring to the drawings, wherein like characters of reference designate corresponding parts, 20 represents a supporting frame generally, comprising a base 21 having upright supports or standards 22 and 23 adjacent opposite ends and fixedly secured to the base in any suitable manner, as at 24. Mounted on the upright supports 22 and 23 and extending therebetween is a rotatable main shaft, indicated generally 25, which is journalled adjacent its respective ends, as at 26 and 27, in journal bearings 28 and 29, which are suitably secured in position on the upright supports by clamp plates 30 and bolts 31. The main shaft is rotated by a gear train, generally indicated 32, which is rotatably actuated from a suitable power source such as motor 33, the gear train and power source being well-known and not described in detail.

Figure 8:
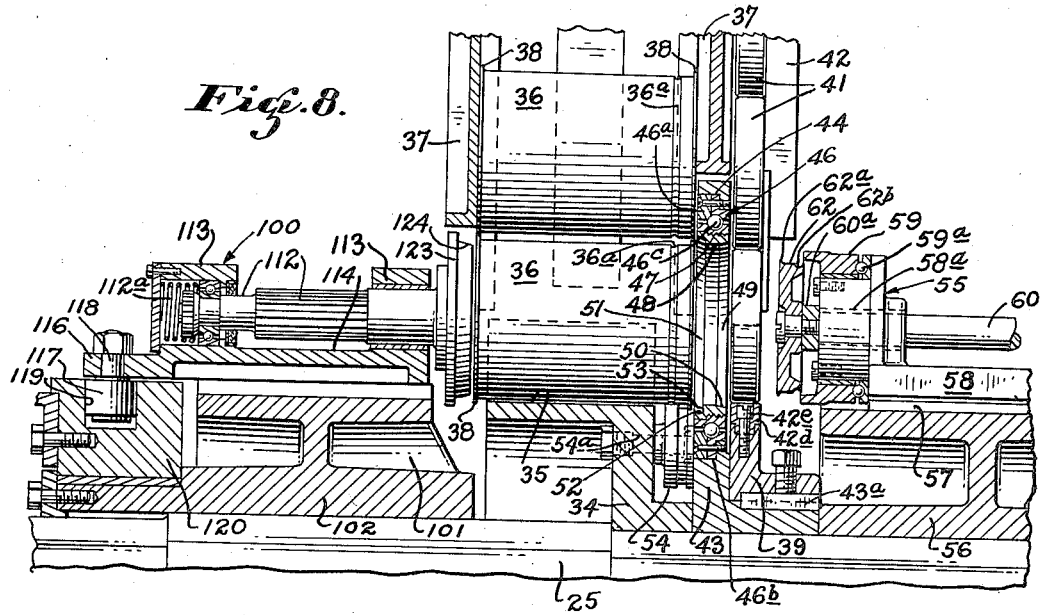
Fig. 8 is an enlarged fragmentary side view of can and collar feed, and collar inserting and spinning head wheel mechanism.
Figure 10:
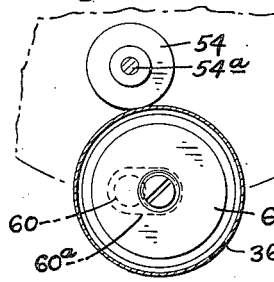
Fig. 10 is a fragmentary enlarged detailed view partly in section on line 10—10 of Fig. 9, showing position of spinning head wheel at the stage of operation shown in Fig. 9.

Fixedly mounted longitudinally centrally on the main shaft 25, as by key 25a, so as to rotate therewith is a carrier wheel or turret 34, the periphery of which is provided with pockets 35 the radial axis of the pockets being substantially parallel with the axis of the main shaft 25. The carrier or turret 34 may have any suitable number of pockets 35, and in this exemplification is provided with six of such pockets into which are successively fed can bodies 36 by means of can feed chute 37 extending downwardly so that the cans are fed into the pockets by gravity. In practice, the cans have been previously flanged radially outwardly at their end portions as indicated at 38. Also fixedly mounted on the main shaft 25 so as to rotate therewith is a collar carrying plate 39 having in its periphery collar-receiving pockets 40, the axis of which are substantially aligned with the axis of the pockets on the carrier wheel. Into these pockets are fed, as by gravity, successive collars 41 through a collar chute 42. The can chute and collar chute are supported at their discharge ends on a truss or arm 42a which in turn is mounted in brackets 42b supported on a protective cover or housing 42c. The collar plate 39 may be provided in each of the pockets 40 with a separate liner 42d and set screw 42e by which the depth of the pocket to receive the collar may be minutely adjusted so that the collar will be substantially axially aligned with the can body and a collar inserting plunger hereinafter to be described. It will be noted that the carrier wheel or turret to receive the can bodies is in longitudinally spaced relation to the collar plate 39 which carries the collars. Mounted fixedly on the main shaft 25, to rotate therewith, is a collar aligning disc, generally indicated 43, which is positioned intermediate the can body turret 34 and the collar plate 39. In the present exemplification, the collar plate is keyed to the hub of the alignment disc as at 43a. The alignment disc 43 has openings 44, in like number with the number of pockets in the can body turret 34 and in the collar plate 39, which openings have axial alignment with the respective pockets 35 and 40. Mounted in each of the openings 44, is a ring member generally indicated 46 which comprises an outer rim 46a fixedly secured within the opening 44 and within which is mounted for rotation an inner alignment guide 46b, as by means of ball bearing 46c, the ring structure or assembly being revolved about the main shaft 25 by the alignment disc 43, and the inner alignment guide 46b being free to rotate on its own axis in said plate 43. The alignment guide member 46b has an opening 47 therein provided with an annular wall, the central portion 48 of which is of substantially the same diameter as the inner diameter of the can body 36 and the outer diameter of the collar 41, so that a collar may have sliding fit therethrough. The wall portion 49 most nearly adjacent the collar plate 39 is tapered radially outwardly as at 50 from the portion 48. The wall at the opposite portion, as indicated 51, is also tapered radially outwardly as at 52 and provides an annular shoulder 53 at its juncture with the circumferential central portion 48. The axial dimension of the pockets 35 is less than the axial dimension of the can body so that the flanged ends 38 of the can will extend therebeyond, and the can will rest in said pocket upon its side wall as best indicated in Fig. 8. The carrier wheel or turret 34 has rotatably mounted thereon, and to revolve about the main shaft therewith, a thrust roller 54 for each of the can receiving pockets on the carrier wheel 34 being mounted for rotation on stub shaft 54a, so that its circumferential face contacts the side wall of the can in the pocket.

The main shaft 25 also has mounted thereon for rotation therewith, collar inserting and spinning mechanism, generally indicated 55, which comprises a hub 56 fixedly secured as by the key 25a, to rotate with the shaft 25, said hub serving to mount on its periphery in dovetailed key slots 57, reciprocable carriages 58, one for each pocket on the carrier wheel. Each of the carriages 58 carries at its end adjacent the can feed a double bearing 58a, which rotatably mounts a ring plunger head 59, which is rotatable thereon by ball bearings 59a. Each of the carriages also carries a rotatably oscillatory shaft 60 supported for rotary oscillation adjacent one end in bearing 58a and at its opposite end in a bearing 61, both bearings mounted to move with the carriage 58. Each shaft 60 is axially offset from alignment with the axis of its complementary pocket 35, alignment guide 47 and collar pocket 40, whereas the plunger head is axially aligned with said pockets and guide. The shaft 60 extends through the bearing 58a, and at its end adjacent the collar feed fixedly mounts a lever 60a. Upon the radial free end of the lever is mounted for rotation on its own axis a spinning tool or what may be termed a spinning wheel head 62 provided with a dull circumferential edge 62a, and to the rear thereof, a groove 62b. The lever 60a is of such length as to position the axis of the spinning wheel head substantially in alignment with the axis of the plunger head 59, and preferably forwardly of the plunger head toward the collar feed, the diameter of the spinning wheel being less than the diameter of the plunger head for reasons which will later be apparent. The opposite end of shaft 60, which is farthest removed from the cap feed, mounts a lever arm 63 at the radially free end of which is mounted a cam roller 64 which runs free until the carriage 58 is reciprocated toward the collar in the manner hereafter described. Each carriage 58 is reciprocated longitudinally of the axis of the apparatus in key slots 57, by a bell crank 65, which may be integrally formed, or as shown herein may comprise two arms 65a and 65b relatively adjustable by clamp 65c. The bell crank 65 is pivotally fulcrumed at 66 on a bracket 67, the plurality of brackets 67 together with a hub, forming a spider wheel 68 keyed to the shaft 25, as by a key 69, for rotation with said shaft. One arm 65a of the bell crank has pivotally connected thereto as at 70, a link 71 which has its opposite end pivotally connected, as at 72, to the carriage 58. The other arm 65b of the bell crank mounts a cam roller 73, which fits into the groove of a cam plate 74, internal cam track 74a which is fixedly mounted to the upright supports 23 in suitable manner such as by bolts 75. Cam track 74 is eccentric at all of its cam effective faces relative to the axis of the shaft 25, as best shown in Fig. 4, being twisted so as to accommodate the cam rollers 73 when the axis thereof changes, from parallel to the main shaft 25 to an angle of inclination relative thereto, upon actuation of the carriage forwardly or toward the can and collar feeding mechanism. It will be observed that as each of the carriages 58 is reciprocated toward the can and collar feeding mechanism, each of the cam rollers 64 at one portion of their revolution about the shaft 25, successively engages a disconnected or orphan cam 76 which causes the shaft 60 to rotatably oscillate on its own axis sufficiently to press the edge of the eccentrically mounted spinning wheel head 62 into engagement with the thrust face of the rollers 54 with the can wall and collar therebetween, the reverse oscillatory rotation of the shaft 60 back to normal being accomplished by coil spring 77. Intermediate the length of shaft 60 is a stop finger 61a which rotates with the shaft 60 and contacts with an adjustable set screw 61b mounted on carriage 58 whereby the spring actuated return oscillation of shaft 60 may be adjusted and regulated.

The end portion of the shaft 25 which is on the opposite side of the can feed mounts thereon an assembly for advancing and rotating a chuck to engage the flanged end of each can to which the can bottom is to be attached. This assembly is generally indicated 100 and comprises a wheel 101 the hub 102 of which is secured to rotate with main shaft 25 as by key 101a, but is adjustable longitudinally of shaft 25. The wheel 101 which may for convenience be termed a star wheel because of its shape illustrated herein, has sections of operative mechanisms equal in number to the pockets of carrier wheel 34. These sections being similar, a description of one section is deemed adequate.

The hub 102 of the wheel 101 mounts brackets 102a which are secured thereon, as by bolts 103, the apexes 103a of the brackets forming a periphery of the star wheel (See Figs. 6 and 7). The apex 103a of each bracket 102a is enlarged to provide bearings 104 for a shaft 105 rotatably oscillatory therein. Shaft 105 is rotatably oscillated by an arm 106 fixedly secured to shaft 105, the free end of the arm 106 mounting a roller 107 which rides in the track of a cam 108, said cam track having its effective cam faces so arranged as to rock the arms 106 and thereby rotatably oscillate shafts 105. Fixedly mounted on shafts 105, preferably between bearings 104, is a collar 109, the latter having an extending web 110 which at its radially outer end supports a quadrant gear 111 which intermeshes with a pinion shaft 112. The pinion shaft 112 is slidably journalled adjacent its opposite ends for rotation in bearings 113 which are fixed to and are movable with a carriage 114 which has a dovetailed slidable mounting in a complementary dovetailed slot 115 on the hub 102 of the wheel. Shaft 112 is longitudinally resilient by spring 112a. The pinion shaft 112 mounts at its end adjacent the carrier wheel 34 a chuck or spinning head 123 having a taper 124 to engage the open bottom end of the can body as best shown at 125 of Figs. 9 and 11. The carriage 114 carries an arm 116 which mounts a roller 117 on a stud 118, the roller 117 being guided in a cam track 19 of a cam hub 120, the cams 108 and 120 being fixed with relation to the rotation of the star wheel by suitable mounting on a plate 121, as by bolts 122.

The assembly 100 is adjustable longitudinally of the axis of shaft 25 by threaded members 126 which are carried by the upright supporting bracket 22, so that assembly 100 may be accommodated to cans of varying lengths being operated upon.

When the can bodies and collars have been operated upon by the foregoing described mechanism and have thus been revolved by carrier wheel or turret, 34, they are evacuated into a discharge chute 130 as shown in Fig. 1 whence they may roll or be otherwise conveyed to storage or place of use, they having collars therein and being flanged to receive top and bottom closures by any suitable means.

In the zone where the collar inserting plunger head 59 and spinning wheel head 62 are operative there are guide plates 200 and 201 which are partially circumferential of, and spaced from, the carrier wheel 34, these plates being stationary and mounted on the base 20 by standards 202. The plate 200 which is adjacent the end of the can which will become the bottom is provided with an offset finger 203, the purpose of the plate being later described.

In the modification of Fig. 14, the apparatus is adapted for clinching a collar into a can body by means of an inter-engaging groove and bead. In this modification, the collar 54 is provided with a circumferential groove and the wheel head 62 is provided with a radially extending bead 205. Upon rotation of the can by the chuck 123, the bead 205 and groove 206 cooperate to spin an inter-engaging groove and bead in the collar and body.

It is to be understood that while the principal purpose of this invention is to spin a certain type of collar into intimate contact relation with a can body, the invention contemplates the use of the same mechanism for forming the inner engaging beads in a can collar and can body. The only change necessary to accomplish this purpose is to change the dull edge 62a of the spinning wheel head to a bead arcuate in cross section, and likewise to change the flat face of the rollers 54 to a roller having a groove therein complementary to the bead on the spinning wheel head, and to cooperate therewith in rolling a bead into the collar and can body which lies therebetween. This modification is shown in Fig. 14 in which the bead on the head 62 is indicated by 205 and the groove in the roller 54 is indicated 206; otherwise, the mechanism and mode of operation being the same.

*Method of operation*

Figure 11:
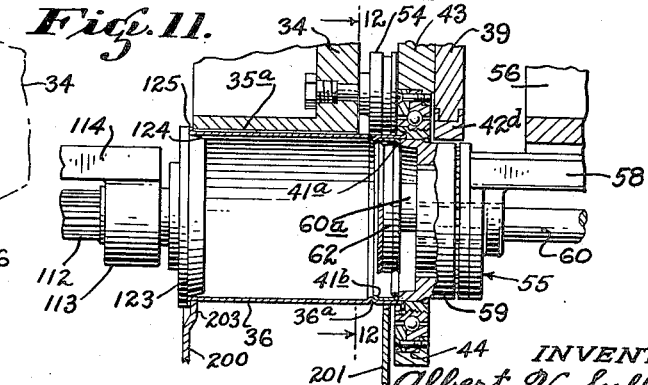
Fig. 11 is a fragmentary enlarged detail view partly in section showing the operation of the spinning head mechanism.

The cans 36, prior to being delivered to the apparatus, have previously been operated upon by an end flanging machine which has flanged the end edges of the can body radially outwardly as at 38, and preferably the can bodies have been previously beaded radially inwardly as at 36a for the purpose of providing an inwardly extending bead circumferentially of the inner can wall to form a seat for the lower edge of a collar member to be inserted. The body blank of the can has also been scored from end to end while flat so that when the can body is formed cylindrically or tubular, there is a scored strip 33a lying between and spaced from both the inturned bead 36a and the adjacent end of the can as in Fig. 9, so that said strip will over-lie a collar inserted within the can as shown in Fig. 11. Said can strip may be removed by winding upon a key, thus providing a tearstrip type of can which is a product well known in the art.

The collar member 41 is also previously formed and preferably is jointless and drawn by die operation from a flat sheet of metal plate. In the forming of the collar by die operation, an annular bead is provided at the upper edge thereof as indicated 41a, and the lower edge of the collar is preferably tapered radially inwardly as at 41b for the dual purposes of seating snugly upon the inner face of bead 36a and to initially facilitate the inserting of the collar through the alignment guide and into the open end of the can body. The jointless drawn collar is described as being preferred in this exemplification, but the mechanism and method of this invention contemplates the use thereof in connection with any suitable type of collar or any suitable type of can body.

Having formed the tubular bodies preferably into generally cylindrical shape with end edges flanged and beaded as aforesaid, and having previously formed the collars, the can bodies 36 are fed, preferably by gravity, through the can feed chute 37 to the carrier wheel or turret 34, the respective cans dropping successively into pockets 35. Simultaneously there are fed can collars 41 in the collar feed chute 42, the collars successively dropping into the pockets 40 of the collar carrying plate 39. It will be observed from Fig. 1 that due to the greater diameter of the can flange as compared with the diameter of the collar, the can body and collar do not approach the mechanism in axial alignment, but that when a can body and a can collar drop into their respective pockets, they are axially aligned.

It is to be presumed that the apparatus is in operation responsive to its power source, motor 33 and gear train 32, so that the main shaft 25 is being rotated and thereby rotates the hubs fixedly mounted thereon of the can carrier wheel or turret 34, alignment plate 43, collar carrier 39, the carriage supporting wheel 56, the spider wheel 68, and the star wheel 101, whereas the cams at opposite ends of the apparatus remain stationary.

The operation with the successive cans and collars is the same in each instance and description of the operations upon one can body in transit through the apparatus is believed to be sufficient. Beginning with the point of operation as shown in Fig. 1, the can 36 drops into the pocket 35 where it is substantially axially aligned with the chuck 123, alignment guide opening 47, a collar 41, spinning head 62, and plunger head 59. In this starting position, the spinning head 62, plunger head 59, and bottom chuck 123 are in spaced relation relative to the respective can body and its collar. As the shaft 25 is rotated, the cam roller 117 and cam track 119 cooperate to advance the carriage 114 toward the can body and the chuck 123 engages the open bottom end of the can body on the bevel 124 and longitudinally moves the can body so that the opposite flanged end thereof snugly seats in the bevel portion 51 of the alignment guide and against the shoulder 53 thereof, the slidability of the chuck being possible by the rack formation of the pinion shaft 112 relative to quadrant gear 111 and the pressure upon the can body being longitudinally resilient due to spring 112a. As the shaft and mechanism fixed thereon rotates further, the carriage 58 is advanced toward the can body responsive to the cam roller 73 riding in the cam track 74a and operating through the bell crank 65 and link 71. As the carriage 58 advances toward the can body, the plunger head 59 engages the beaded edge of the collar 41 and carries it through the portion 48 of alignment guide opening 47, the tapered portion 49 serving to precisely guide the collar into the portion 48, which trues the collar for a precise fit into the can end, (see Fig. 9). Upon further rotation of shaft 25 the collar is further advanced until it is seated with its inturned bevel 41b seated on the inturned bead 36a. When the collar is thus seated, the effective operation of the roller 73 in cam track 74a temporarily ceases, but it will be noted that the lever 63 and roller 64 have been advanced toward the can with carriage 58 so that the roller 64 engages the disconnected or orphan cam 76 which operates to rotatively oscillate the shaft 60 on the opposite end of which is eccentrically mounted the spinning head 62, the spinning head being thereby moved into eccentric relationship to the can so that its dull spinning edge 62a presses forcibly into the bevel portion at the lower end of the collar, with the thrust of said pressure being against the circumferential face of roller 54, (see Fig. 11), and simultaneously with this operation the groove 62b engages the collar bead 41a and rolls the bead so that its terminal edge is tight against the inner wall of the collar, as best shown in the enlarged detail of Fig. 15.

Figure 9:
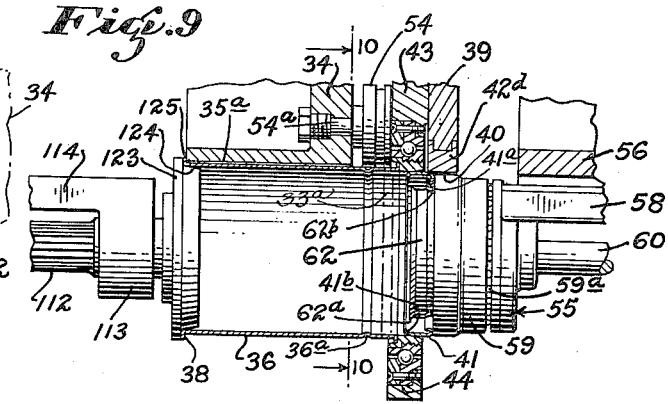
Fig. 9 is an enlarged fragmentary detailed view partly in section showing detail of can turret and collar inserting plunger with collar partly inserted in a can.
Figure 12:
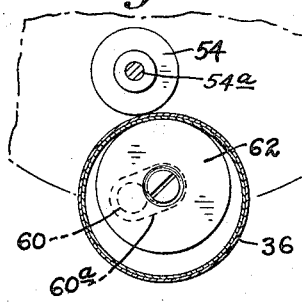
Fig. 12 is a fragmentary enlarged detailed view partly in section on line 12—12 of Fig. 11, showing position of spinning head wheel at the stage of operation shown in Fig. 11.

It will be noted in Figs. 9 and 11 that when the chuck head 123 engages the can body it lifts the can body just sufficient to have clearance for rotation relative to the face of the pocket 35, as indicated at 35a. At this stage of the operation, the roller 107 and cam track 108 become effective, to rotatively oscillate the shaft 105, which in turn operates the quadrant gear 111, thereby rotating the chuck 123 and the can 36 on the axis thereof, the can being permitted to rotate by virtue of its opposite end being mounted against the shoulder of ring 46, which, as above stated, is rotatable in its mounting. The can being thus rotated and the spinning wheel head having been positioned forcibly against the lower portion of the collar adjacent its tapered end, the collar is spun into tight intimate frictional contact with the can body at the ledge of the inturned bead. The mechanism is so arranged and synchronized that when this operation is completed the roller 64 is released from its bearing on the disconnected cam 76, and thereupon the spinning wheel head 62 returns to a position concentric with the plunger head 59 responsive to spring 77 rotatively oscillating shaft 60, the degree of return rotation being regulated by the finger 61a. Simultaneously with the last mentioned operation the cam roller 73 operates in the cam track 74a to retract the carriage 58 responsive to the bell crank 65 and link 71, this latter operation withdrawing the plunger head 59 and the spinning wheel 62 from within the can end to the position at which its operation commenced as shown in Fig. 8. At this point of operation, the cam roller 107 will have reached a position in the track 108 where its effect is neutral, and the rotation of the chuck 123 and can 36 is ceased. The cam track 119 and roller 117 then become effective by further rotation of shaft 25 to retract the carriage 114 in direction right to left in Fig. 1, which, due to the tapered end 124 of the chuck 123 and the comparatively tight seat of the can thereon, retracts the can from the alignment guide and repositions it in the pocket 35 in line with the cans as they are originally fed into said pockets.

In practice, it has been found that the collared end of an occasional can will become impacted in the tapered portion 51 of the alignment guide and will therefore be loosened from its seat on the taper 124 of the chuck so that it is not retracted with the chuck. Therefore, the guide plates 200 and 201 are provided, the functions of which are to engage the flanges of the can body and to guide the can into retracted movement with the chuck 123, the offset finger 203 being slightly spiraled so that as the can is revolved by the carrier wheel thereagainst, the flanged end seated on the chuck will be caused to follow the chuck, and the guide plate 201 when it engages the flange at the opposite end of the can will prevent the can from being retracted too great a distance. By this stage of the operation, the can with the collar therein has been revolved to a position indicated "A" in Fig. 7, at which point it may drop by gravity into a discharge chute 130 and is thereby conveyed away from the apparatus for such use as may be desired.

As indicated in Fig. 14, if it is desired to bead a can and collar into clinched relationship while the can and collar are being revolved on a single turret or carrier wheel, it is necessary only to modify the circumferential face of the roller 54 and the wheel head 62 by providing complementary circumferential bead 205 and circumferential groove 206 in said roller and wheel. In this exemplification of Fig. 14, the groove 206 has been shown in roller 54 and the bead 205 has been shown in the wheel head 62, though it is obvious that the bead and groove could be reversed so that the roller 54 would carry the bead, and the wheel head 62 would carry the groove.

It will be noted that the collar inserting plunger and the spinning wheel head or tool operate as a mechanical unit to insert the collar and perform the spinning operation while the can body is at a single station, although that station is progressively advanced.

What I claim as new and patentable is:—

1. A device for making cans, including mechanism to receive and support a can body at a station, means for inserting a collar into the can body at said station, means including an eccentric mechanism for spinning said collar and body into fixed relationship one to the other, said collar inserting means and said spinning means being operable while the body is at a single station.

2. In a can making apparatus which has means to receive and rotatively advance a can body and a collar in axially spaced relationship and which has a guide member between can body and collar, a member adapted for engaging one end of the can body and for moving the can body axially into engagement with the guide member, mechanism adjacent the other end of the can body which is adapted for reciprocation and which includes a member adapted for inserting the collar in the can body through said guide member and a tool adapted for spinning the inserted collar into fixed engagement with the side wall of the can.

3. In a can making apparatus which has means to receive and rotatively advance a can body and a collar in axially spaced relationship and which has a rotatively mounted guide means for the collar therebetween, a rotatable and reciprocable means adapted for engaging one end of the can body and for moving the can body axially into engagement with the rotatable guide means, mechanism adjacent the other end of the can body which is adapted for reciprocation and which includes a member adapted for inserting the collar in the can body through said guide member and a tool adapted for spinning the inserted collar into fixed engagement with the side wall of the can.

4. A can making apparatus which includes rotatable means to receive and revolubly advance a can body and a collar in axially spaced relationship, a rotatable member having an opening therethrough mounted between the respective can body and collar receiving portions of said first mentioned means, a member adapted for engaging one end of the can body and for moving the can body axially into engagement with said rotatable member which has an opening therethrough, mechanism adjacent the other end of the can body receiving means, said last mentioned mechanism being adapted for reciprocation and including a member for inserting the collar in the can body through said opening of said rotatable member, and a tool adapted for spinning the inserted collar into fixed engagement with the side wall of the can.

5. A device for making tear strip cans, including mechanism for receiving at a station a tubular can body having a scored strip adjacently spaced from a proximate end, and mechanism operable at said station for inserting a collar in said tubular can body in overlying relation to the scored strip and fixedly securing said collar in said tubular can body, said last mentioned mechanism including a pair of reciprocable members one of which is adapted for engaging an outer edge of a collar and the other of which includes a rotatably mounted head adapted for entering into the can body and engaging the radially inner face of the collar in spaced relation to the axially outer edge of the collar and axially inwardly of the zone which overlies the scored strip.

6. A device for making tear strip cans including mechanism for receiving a tubular can body having a scored strip adjacently spaced from a proximate end and providing a movable station for said tubular can body, mechanism operable at said station for inserting and fixedly securing a collar in said tubular can body in overlying relation to the scored strip, said last mentioned mechanism including a pair of reciprocable members one of which is adapted for engaging an outer edge of a collar and the other of which includes a rotatably mounted head adapted for entering into the can body and engaging the radially inner face of the collar in spaced relation to the axially outer edge of the collar and axially inwardly of the zone which overlies the scored strip, and means to progressively advance the mechanism which provides said station.

7. A device for making cans including means for positioning in axial alignment and in spaced relation a collar and a tubular can body having a circumferential scored strip, mechanism operable at a single station for inserting the collar in the tubular can body in overlying relation to the scored strip and tightly connecting said collar in contact with the inner wall of the tubular can body, said last mentioned mechanism including a pair of reciprocable members, one of which includes a rotatably mounted head adapted for engaging an outer edge of a collar and the other of which is adapted for entering into the can body and engaging the radially inner face of the collar in spaced relation to the axially outer edge of the collar and axially inwardly of the zone which overlies the scored strip.

8. A device for making cans including means for positioning in axial alignment a collar and a tubular can body having a circumferentially scored strip spaced from a proximate end edge, means for inserting a collar in said tubular body in overlying relation to the scored strip, and mechanism operable upon the can body and collar axially inwardly to the zone of the tear strip and adapted for spinning said collar and body into fixed relationship one to the other, said collar inserting means and said spinning means being operable while the body and collar are axially aligned at a single station, and means to progressively advance said station while said collar inserting means and said spinning means are being operated.

9. A device of the character described, including a rotatable mechanism for receiving a can body and collar, said mechanism having a station at which the can body and collar are revolved about a common axis, means for inserting the collar in the can body, a spinning tool, means to insert said spinning tool within the can body and engage the spinning tool with the collar inwardly from the outer collar edge, and means for causing relative rotation between can body and spinning tool, said last mentioned means and said collar inserting means and said spinning tool being operable while the can body and collar are axially aligned at a single station, and means to progressively advance said station while said collar inserting means and said spinning means are being operated.

10. A device for making cans, including rotatable mechanism providing a station to receive and support a can body and collar in substantial axial alignment, means operable at said station adapted for inserting the collar in the can body and for fixedly securing the collar in the can body, said last mentioned means being adapted for revolving about an axis common to the rotatable mechanism which supports the can body and collar, and said last mentioned means including a pair of members one of which is adapted for engaging an outer edge of a collar and the other of which includes an eccentrically operated mechanism and is adapted for entering into the can body and engaging the radially inner face of the collar in spaced relation to the axially outer edge of the collar.

11. A device for making cans, including a rotatable mechanism for receiving a can body and collar, means adapted for inserting and fixedly securing the collar in the can body, said last mentioned means including a reciprocable mechanism adapted for revolving about an axis common to the means which carries the can and the collar, and said reciprocable mechanism including a collar inserting head and a member adapted for entering within the can body; and means for moving the last mentioned member laterally relative to the can axis and into engagement with the radially inward face of the collar.

12. A device of the character described, including a rotatable mechanism for receiving a can body and open collar, said mechanism providing a station at which the can body and collar are revolved about a common axis, means for inserting the collar in the can body, a pair of cooperative spinning tools, one of which is adapted for entering into the can body through the collar opening, means to move the spinning tool in the can laterally of the can axis, and means for causing relative rotation between the collared can body and the spinning tools, said last mentioned means and said collar inserting means and said spinning tools being operable while the can body and collar are axially aligned at a single station.

13. A device of the character described, including rotatable mechanism for receiving a can body and an open collar, said mechanism providing a station at which the can body and collar revolve about a common axis, means for inserting the collar in the can body, a pair of cooperatively disposed spinning tools, one of which is adapted for entering into the can body through the collar opening, means to move the spinning tool in the can laterally of the can axis, and means for causing relative rotation between the collared can body and spinning tools, said last mentioned means and said collar inserting means and said spinning tool being adapted for revolving about said common axis and being operable while the can body and collar are axially aligned at a single station.

14. In a can making apparatus which has means to receive and rotatively advance a can body and a collar in spaced relation, a reciprocable mechanism which includes a member adapted to insert the collar in the can body and a tool adapted for entering into the can body; means to move the last mentioned tool laterally of the axis of the can and into engagement with the radially inner face of the collar, and means whereby said collared can body and said tool within the can may be rotated.

15. A device for making cans, including mechanism for receiving a tubular can body at a station, and mechanism for inserting a collar in said tubular can body and fixedly securing said collar in said tubular can body at said station, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, the said device including reciprocable and rotatable means adapted for engaging the can at its end portion opposite the collar and axially rotating it, and means for reciprocating and rotating said last mentioned can engaging means.

16. A device for making cans, including mechanism for receiving a tubular can body and providing a movable station for said tubular can body, mechanism for inserting and fixedly securing a collar in said tubular can body at said station, said last mentioned mechansm including a pair of members one of which is adapted for engaging an outer edge of a collar and the other of which is adapted for entering into the can body through the collar and engaging the radially inner face of the collar in spaced relation to the axially outer edge of the collar, and means to progressively advance the mechanism which provides said station, the said device including reciprocable and rotatable means adapted for engaging the can at its end portion opposite the collar and axially rotating it, and means for reciprocating and rotating said last mentioned can engaging means.

17. A device for making cans including means for positioning a tubular can body and a collar in axial alignment and in spaced relation, mechanism operable at a single station for inserting the collar in the tubular can body and spinning said collar into intimate frictional contact with the inner wall of the tubular can body, said last mentioned mechanism including a pair of members, one of which is adapted for engaging an outer edge of a collar and the other of which is adapted for entering into the can body through the collar and engaging the radially inner face of the collar in spaced relation to the axially outer edge of the collar, the said device including reciprocable and rotatable means adapted for engaging the can at its end portion opposite the collar and axially rotating it, and means for reciprocating and rotating said last mentioned can engaging means.

18. A device for making cans including means for positioning a tubular can body and a collar in axial alignment, means for inserting a collar in said tubular can body, and for spinning said collar and body into fixed relationship one to the other, said inserting and spinning means being operable while the body and collar are axially aligned at a single station, said last mentioned means including a pair of members one of which is adapted for engaging an outer edge of a collar and the other of which is adapted for entering into the can body through the collar and engaging the radially inner face of the collar in spaced relation to the axially outer edge of the collar, the said device including reciprocable and rotatable means adapted for engaging the can at its end portion opposite the collar and axially rotating it, and means for reciprocating and rotating said last mentioned can engaging means.

19. A device for making cans including means for positioning a tubular body and a collar in axial alignment, means for inserting a collar in said tubular body, and mechansm adapted for spinning said collar and body into fixed relationship one to the other, said last mentioned mechansm including a pair of members one of which is adapted for engaging an outer edge of a collar and the other of which is adapted for entering into the body through the collar and engaging the radially inner face of the collar in spaced relation to the axially outer edge of the collar, said collar inserting means and said spinning means being operable while the body and collar are axially aligned at a single station, and means to progressively advance said station while said collar inserting means and said spinning means are being operated, the said device including reciprocable and rotatable means adapted for engaging the can at its end portion opposite the collar and axially rotating it, and means for reciprocating and rotating said last mentioned can engaging means.

20. A device for making cans, including mechanism to receive and support a can body at a station, means for inserting a collar into the can body at said station, means including an eccentric mechanism for spinning said collar and body into fixed relationship one to the other, said collar inserting means and said spinning means being operable while the body is at a single station, the said device including reciprocable and rotatable means adapted for engaging the can at its end portion opposite the collar and axially rotating it, and means for reciprocating and rotating said last mentioned can engaging means.

21. A device for making cans, including rotatable mechanism to receive and support a can body and collar in substantial axial alignment, means adapted for inserting the collar in the can body and for fixedly securing the collar in the can body, said last mentioned means being operable as a unit and adapted to be revolved about an axis common to the rotatable mechanism which supports the can body and collar, and said last mentioned means, including a pair of members one of which is adapted for engaging an outer edge of a collar and the other of which is adapted for entering into the can body through the collar and engaging the radially inner face of the collar in spaced relation to the axially outer edge of the collar, the said device including reciprocable and rotatable means adapted for engaging the can at its end portion opposite the collar and axially rotating it, and means for reciprocating and rotating said last mentioned can engaging means.

22. A device for making cans including a rotatable mechanism having pockets for receiving a can body and collar, respectively, a guide member for the collar interposed between said pockets and adapted for rotation therewith, means adapted for inserting and fixedly securing the collar in the can body, said last mentioned means including a collar inserting mechanism and a spinning tool and means to insert the spinning tool within the can body through the collar, the said last mentioned inclusive means being adapted for revolving as a unitary structure about an axis common to the means which carries the can and the collar; and means to revolve said unitary structure, the said device including reciprocable and rotatable means adapted for engaging the can at its end portion opposite the collar and axially rotating it, and means for reciprocating and rotating said last mentioned can engaging means.

23. A device for making cans, including a rotatable mechanism for receiving a can body and collar, means adapted for inserting and fixedly securing the collar in the can body, said last mentioned means including a reciprocable mechanism adapted for revolving about an axis common to the means which carries the can and the collar, and said reciprocable mechanism including a collar inserting head and a member adapted for entering within the can body; and means for moving the last mentioned member laterally relative to the can axis and into engagement with the radially inward face of the collar, the said device including reciprocable and rotatable means adapted for engaging the can at its end portion opposite the collar and axially rotating it, and means for reciprocating and rotating said last mentioned can engaging means.

24. A device of the character described, including a rotatable mechanism for receiving a can body and open collar, said mechanism providing a station at which the can body and collar are revolved about a common axis, means for inserting the collar in the can body, a pair of cooperative spinning tools, one of which is adapted for entering into the can body through the collar opening, means to move the spinning tool in the can laterally of the can axis, and means for causing relative rotation between the collared can body and the spinning tools, said last mentioned means and said collar inserting means and said spinning tools being operable while the can body and collar are axially aligned at a single station, the said device including reciprocable and rotatable means adapted for engaging the can at its end portion opposite the collar and axially rotating it, and means for reciprocating and rotating said last mentioned can engaging means.

25. A device of the character described, including rotatable mechanism for receiving a can body and an open collar, said mechanism providing a station at which the can body and collar revolved about a common axis, means for inserting the collar in the can body, a pair of cooperatively disposed spinning tools, one of which is adapted for entering into the can body through the collar opening, means to move the spinning tool in the can laterally of the can axis, and means for causing relative rotation between the collared can body and spinning tools, said last mentioned means and said collar inserting means and said spinning tool being adapted for revolving about said common axis and being operable while the can body and collar are axially aligned at a single station, the said device including reciprocable and rotatable means adapted for engaging the can at its end portion opposite the collar and axially rotating it, and means for reciprocating and rotating said last mentioned can engaging means.

26. In a can making apparatus which has means to receive and rotatively advance a can body and a collar in spaced relation, a reciprocable mechanism which includes a member adapted to insert the collar in the can body and a tool adapted for entering into the can body; means to move the last mentioned tool laterally of the axis of the can and into engagement with the radially inner face of the collar, and means whereby said collared can body and said tool within the can may be rotated, the said device including reciprocable and rotatable means adapted for engaging the can at its end portion opposite the collar and axially rotating it, and means for reciprocating and rotating said last mentioned can engaging means.

27. A device for making cans, including mechanism for receiving a tubular can body at a station, and mechanism for inserting a collar in said tubular can body and fixedly securing said collar in said tubular can body at said station, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, the said device having reciprocable and rotatable mechanism including an oscillatory rotatable gear adapted for engaging the can at its end portion opposite the collar and axially rotating it.

28. A device for making cans, including mechanism for receiving a tubular can body and providing a movable station for said tubular can body, mechanism for inserting and fixedly securing a collar in said tubular can body at said station, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, and means to progressively advance the mechanism which provides said station, the said device having reciprocable and rotatable mechanism including an oscillatory rotatable gear adapted for engaging the can at its end portion opposite the collar and axially rotating it.

29. A device for making cans including means for positioning a tubular can body and a collar in axial alignment and in spaced relation, mechanism operable at a single station for inserting the collar in the tubular can body and spinning said collar into intimate frictional contact with the inner wall of the tubular can body, said last mentioned mechanism including a pair of members, one of which is adapted for engaging an outer edge of a collar and the other of which is adapted for entering into the can body through the collar and engaging the radially inner face of the collar in spaced relation to the axially outer edge of the collar, the said device having reciprocable and rotatable mechanism including an oscillatory rotatable gear adapted for engaging the can at its end portion opposite the collar and axially rotating it.

30. A device for making cans including means for positioning a tubular can body and a collar in axial alignment, means for inserting a collar in said tubular can body, and for spinning said collar and body into fixed relationship one to the other, said inserting and spinning means being operable while the body and collar are axially aligned at a single station, said last mentioned means including a pair of members one of which is adapted for entering into the can body through the collar and engaging the radially inner face of the collar in spaced relation to the axially outer edge of the collar, the said device having reciprocable and rotatable mechanism including an oscillatory rotatable gear adapted for engaging the can at its end portion opposite the collar and axially rotating it.

31. A device for making cans including means for positioning a tubular body and a collar in axial alignment, means for inserting a collar in said tubular body, and mechanism adapted for spinning said collar and body into fixed relationship one to the other, said last mentioned mechanism including a pair of members one of which is adapted for engaging an outer edge of a collar and the other of which is adapted for entering into the body through the collar and engaging the radially inner face of the collar in spaced relation to the axially outer edge of the collar, said collar inserting means and said spinning means being operable while the body and collar are axially aligned at a single station, and means to progressively advance said station while said collar inserting means and said spinning means are being operated, the said device having reciprocable and rotatable mechanism including an oscillatory rotatable gear adapted for engaging the can at its end portion opposite the collar and axially rotating it.

32. A device for making cans, including mechanism to receive and support a can body at a station, means for inserting a collar into the can body at said station, means including an eccentric mechanism for spinning said collar and body into fixed relationship one to the other, said collar inserting means and said spinning means being operable while the body is at a single station, the said device having reciprocable and rotatable mechanism including an oscillatory rotatable gear adapted for engaging the can at its end portion opposite the collar and axially rotating it.

33. A device for making cans, including rotatable mechanism to receive and support a can body and collar in substantial axial alignment, means adapted for inserting the collar in the can body and for fixedly securing the collar in the can body, said last mentioned means being operable as a unit and adapted to be revolved about an axis common to the rotatable mechanism which supports the can body and collar, and said last mentioned means including a pair of members one of which is adapted for engaging an outer edge of a collar and the other of which is adapted for entering into the can body through the collar and engaging the radially inner face of the collar in spaced relation to the axially outer edge of the collar, the said device having reciprocable and rotatable mechanism including an oscillatory rotatable gear adapted for engaging the can at its end portion opposite the collar and axially rotating it.

34. A device for making cans including a rotatable mechanism having pockets for receiving a can body and collar, respectively, a guide member for the collar interposed between said pockets and adapted for rotation therewith, means adapted for inserting and fixedly securing the collar in the can body, said last mentioned means including a collar inserting mechanism and a spinning tool and means to insert the spinning tool within the can body through the collar, the said last mentioned inclusive means being adapted for revolving as a unitary structure about an axis common to the means which carries the can and the collar; and means to revolve said unitary structure, the said device having reciprocable and rotatable mechanism including an oscillatory rotatable gear adapted for engaging the can at its end portion opposite the collar and axially rotating it.

35. A device for making cans, including a rotatable mechanism for receiving a can body and collar, means adapted for inserting and fixedly securing the collar in the can body, said last mentioned means including a reciprocable mechanism adapted for revolving about an axis common to the means which carries the can and the collar, and said reciprocable mechanism including a collar inserting head and a member adapted for entering within the can body; and means for moving the last mentioned member laterally relative to the can axis and into engagement with the radially inward face of the collar, the said device having reciprocable and rotatable mechanism including an oscillatory rotatable gear adapted for engaging the can at its end portion opposite the collar and axially rotating it.

36. A device of the character described, including a rotatable mechanism for receiving a can body and open collar, said mechanism providing a station at which the can body and collar are revolved about a common axis, means for inserting the collar in the can body, a pair of cooperative spinning tools, one of which is adapted for entering into the can body through the collar opening, means to move the spinning tool in the can laterally of the can axis, and means for causing relative rotation between the collared can body and the spinning tools, said last mentioned means and said collar inserting means and said spinning tools being operable while the can body and collar are axially aligned at a single station, the said device having reciprocable and rotatable mechanism including an oscillatory rotatable gear adapted for engaging the can at its end portion opposite the collar and axially rotating it.

37. A device of the character described, including rotatable mechanism for receiving a can body and an open collar, said mechanism providing a station at which the can body and collar are revolved about a common axis, means for inserting the collar in the can body, a pair of co-operatively disposed spinning tools, one of which is adapted for entering into the can body through the collar opening, means to move the spinning tool in the can laterally of the can axis, and means for causing relative rotation between the collared can body and spinning tools, said last mentioned means and said collar inserting means and said spinning tool being adapted for revolving about said common axis and being operable while the can body and collar are axially aligned at a single station, the said device having reciprocable and rotatable mechanism including an oscillatory rotatable gear adapted for engaging the can at its end portion opposite the collar and axially rotating it.

38. In a can making apparatus which has means to receive and rotatively advance a can body and a collar in spaced relation, a reciprocable mechanism which includes a member adapted to insert the collar in the can body and a tool adapted for entering into the can body; means to move the last mentioned tool laterally of the axis of the can and into engagement with the radially inner face of the collar, and means whereby said collared can body and said tool within the can may be rotated, the said device having reciprocable and rotatable mechanism including an oscillatory rotatable gear adapted for engaging the can at its end portion opposite the collar and axially rotating it.

39. A device for making cans, including mechanism for receiving a tubular can body at a station, and mechanism for inserting a collar in said tubular can body and fixedly securing said collar in said tubular can body at said station, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, the said device including reciprocable and rotatable mechanism adapted for engaging the can at its end portion opposite the collar and for lifting said can from contact with its seat at its station and to axially rotate said can in its lifted position.

40. A device for making cans, including mechanism for receiving a tubular can body and providing a movable station for said tubular can body, mechanism for inserting and fixedly securing a collar in said tubular can body at said station, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, and means to progressively advance the mechanism which provides said station, the said device including reciprocable and rotatable mechanism adapted for engaging the can at its end portion opposite the collar and for lifting said can from contact with its seat at its station and to axially rotate said can in its lifted position.

41. A device for making cans including means for positioning a tubular can body and a collar in axial alignment and in spaced relation, mechanism operable at a single station for inserting the collar in the tubular can body and spinning said collar into intimate frictional contact with the inner wall of the tubular can body, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, the said device including reciprocable and rotatable mechanism adapted for engaging the can at its end portion opposite the collar and for lifting said can from contact with its seat at its station and to axially rotate said can in its lifted position.

42. A device for making cans including means for positioning a tubular can body and a collar in axial alignment, means for inserting a collar in said tubular can body, and for spinning said collar and said tubular can body, and for spinning said collar and body into fixed relationship one to the other, said inserting and spinning means being operable while the body and collar are axially aligned at a single station, said last mentioned means including a pair of members one of which is adapted for engaging an outer edge of a collar and the other of which is adapted for entering into the can body through the collar and engaging the radially inner face of the collar in spaced relation to the axially outer edge of the collar, the said device including reciprocable and rotatable mechanism adapted for engaging the can at its end portion opposite the collar and for lifting said can from contact with its seat at its station and to axially rotate said can in its lifted position.

43. A device for making cans including means for positioning a tubular body and a collar in axial alignment, means for inserting a collar in said tubular body, and mechanism adapted for spinning said collar and body into fixed relationship one to the other, said last mentioned mechanism including a pair of members one of which is adapted for engaging an outer edge of a collar and the other of which is adapted for entering into the body through the collar and engaging the radially inner face of the collar in spaced relation to the axially outer edge of the collar, said collar inserting means and said spinning means being operable while the body and collar are axially aligned at a single station, and means to progressively advance said station while said collar inserting means and said spinning means are being operated, the said device including reciprocable and rotatable mechanism adapted for engaging the can at its end portion opposite the collar and for lifting said can from contact with its seat at its station and to axially rotate said can in its lifted position.

44. A device for making cans, including mechanism to receive and support a can body at a station, means for inserting a collar into the can body at said station, means including an eccentric mechanism for spinning said collar and body into fixed relationship one to the other, said collar inserting means and said spinning means being operable while the body is at a single station, the said device including a reciprocable unit which includes a collar inserting head and a member adapted for entering into the can body through the collar, and intermittently operative means to move said member, while within the can body, into contact engagement with the radially inner face of the collar.

45. A device for making cans, including rotatable mechanism to receive and support a can body and collar in substantial axial alignment, means adapted for inserting the collar in the can body and for fixedly securing the collar in the can body, said last mentioned means being operable as a unit and adapted to be revolved about an axis common to the rotatable mechanism which supports the can body and collar, and said last mentioned means including a pair of members one of which is adapted for engaging an outer edge of a collar and the other of which is adapted for entering into the can body through the collar and engaging the radially inner face of the collar in spaced relation to the axially outer edge of the collar, the said device including reciprocable and rotatable mechanism adapted for engaging the can at its end portion opposite the collar and for lifting said can from contact with its seat at its station and to axially rotate said can in its lifted position.

46. A device for making cans including a rotatable mechanism having pockets for receiving a can body and collar, respectively, a guide member for the collar interposed between said pockets and adapted for rotation therewith, means adapted for inserting and fixedly securing the collar in the can body, said last mentioned means including a collar inserting mechanism and a spinning tool and means to insert the spinning tool within the can body through the collar, the said last mentioned inclusive means being adapted for revolving as a unitary structure about an axis common to the means which carries the can and the collar; and means to revolve said unitary structure, the said device including reciprocable and rotatable mechanism adapted for engaging the can at its end portion opposite the collar and for lifting said can from contact with its seat at its station and to axially rotate said can in its lifted position.

47. A device for making cans, including a rotatable mechanism for receiving a can body and collar, means adapted for inserting and fixedly securing the collar in the can body, said last mentioned means including a reciprocable mechanism having means adapted for engaging the outer edge of the collar and propelling the collar into the can body upon reciprocation of said reciprocable mechanism, and said reciprocable mechanism including a rotatable head normally axially aligned with the collar propelling means and adapted for movement into the can body through the collar, means for moving said rotatable head eccentrically relative to the collar propelling means and into engagement with the inner edge portion of the collar, and means for engaging the can at its end portion opposite the collar and for lifting said can from contact with its seat at its station, and means to axially rotate the can.

48. A device of the character described, including a rotatable mechanism for receiving a can body and open collar, said mechanism providing a station at which the can body and collar are revolved about a common axis, means for inserting the collar in the can body, a pair of cooperative spinning tools, one of which is adapted for entering into the can body through the collar opening, means to move the spinning tool in the can laterally of the can axis, and means for causing relative rotation between the collared can body and the spinning tools, said last mentioned means and said collar inserting means and said spinning tools being operable while the can body and collar are axially aligned at a single station, the said device including reciprocable and rotatable mechanism adapted for engaging the can at its end portion opposite the collar and for lifting said can from contact with its seat at its station and to axially rotate said can in its lifted position.

49. A device of the character described, including rotatable mechanism for receiving a can body and an open collar, said mechanism providing a station at which the can body and collar are revolved about a common axis, means for inserting the collar in the can body, a pair of cooperatively disposed spinning tools, one of which is adapted for entering into the can body through the collar opening, means to move the spinning tool in the can laterally of the can axis, and means for causing relative rotation between the collared can body and spinning tools, said last mentioned means and said collar inserting means and said spinning tool being adapted for revolving about said common axis and being operable while the can body and collar are axially aligned at a single station, the said device including reciprocable and rotatable mechanism adapted for engaging the can at its end portion opposite the collar and for lifting said can from contact with its seat at its station and to axially rotate said can in its lifted position.

50. In a can making apparatus which has means to receive and rotatively advance a can body and a collar in spaced relation, a reciprocable mechanism which includes a member adapted to insert the collar in the can body and a tool adapted for entering into the can body; means to move the last mentioned tool laterally of the axis of the can and into engagement with the radially inner face of the collar, and means whereby said collared can body and said tool within the can may be rotated, the said device including reciprocable and rotatable mechanism adapted for engaging the can at its end portion opposite the collar and for lifting said can from contact with its seat at its station and to axially rotate said can in its lifted position.

51. A device for making cans, including mechanism for receiving a tubular can body at a station, and mechanism for inserting a collar in said tubular can body and fixedly securing said collar in said tubular can body at said station, said last mentioned mechanism including a reciprocable unit having a collar inserting head and a tool member, the latter of which being adapted for entering into the can body through the collar and engaging the radially inner face of the collar in spaced relation to the axially outer edge of the collar, means for reciprocating said unit, and intermittently operative means to move said tool member, while within the can body, into contact engagement with the radially inner face of the collar.

52. A device for making cans, including mechanism for receiving a tubular can body and providing a movable station for said tubular can body, mechanism for inserting and fixedly securing a collar in said tubular can body at said station, said last mentioned mechanism including a reciprocable unit having a collar inserting head and a tool member, the former of which being adapted for engaging an outer edge of a collar and the latter of which is adapted for entering into the can body through the collar and engaging the radially inner face of the collar in spaced relation to the axially outer edge of the collar, means to progressively advance the mechanism which provides said station, means for reciprocating said reciprocable unit, and intermittently operative means to move said tool member, while within the can body, into contact engagement with the radially inner face of the collar.

53. A device for making cans including means for positioning a tubular can body and a collar in axial alignment and in spaced relation, mechanism reciprocable as a unit and operable at a single station for inserting the collar in the tubular can body and spinning said collar, one of which is adapted for engaging an outer edge of a collar and the other of which is adapted for entering into the can body through the collar and engaging the radially inner face of the collar in spaced relation to the axially outer edge of the collar, and intermittently operative means to move the latter of said member, while within the can body, into contact engagement with the radially inner face of the collar, and means to reciprocate said unitary reciprocable mechanism.

54. A device for making cans including means for positioning a tubular body and a collar in axial alignment, means reciprocable as a unit and adapted for inserting a collar in said tubular body and spinning said collar and body into fixed relationship one to the other, said last mentioned means including a pair of members one of which is a spinning tool adapted for engaging an outer edge of a collar and the other of which is adapted for entering into the body through the collar and engaging the radially inner face of the collar in spaced relation to the axially outer edge of the collar, said collar inserting head and said spinning tool being operable while the body and collar are at a single station, and means to progressively advance said station while said collar inserting head and said spinning tool are being operated, intermittently operative means to move said spinning tool, while within the can body, into contact engagement with the radially inner face of the collar, and means to reciprocate said unitary reciprocable mechanism.

55. A device for making cans including means for positioning a tubular body and a collar in axial alignment, means reciprocably as a unit and adapted for inserting and fixedly securing a collar in said tubular body, and said last mentioned mechanism including collar inserting means for engaging an outer edge of a collar and a rotatable tool for entering into the body through the collar and engaging the radially inner face of the collar in spaced relation to the axially outer edge of the collar, said collar inserting means and said rotatable tool being operable while the body and collar are axially aligned at a single station, means to progressively advance said station while said collar inserting means and said rotatable tool are being operated, means to reciprocate said unitary reciprocable means, and intermittently operative means to move said rotatable tool, while within the can body, into contact engagement with the radially inner face of the collar.

56. A device for making cans, including mechanism to receive and support a can body at a station, mechanism reciprocable as a unit including means for inserting a collar into the can body at said station and means including an eccentric mechanism for spinning said collar and body into fixed relationship one to the other, said collar inserting means and said spinning means being operable while the body is at a single station, and intermittently operative means to move said member, while within the can body, into contact engagement with the radially inner face of the collar.

57. A device for making cans, including rotatable mechanism to receive and support a can body and collar in substantial axial alignment, means reciprocable as a unit and adapted for inserting the collar in the can body and for fixedly securing the collar in the can body, said last mentioned means being and adapted to be revolved about an axis common to the rotatable mechanism which supports the can body and collar, and said last mentioned means including a pair of members the first of which is adapted for engaging an outer edge of a collar and the second of which is adapted for entering into the can body through the collar and engaging the radially inner face of the collar in spaced relation to the axially outer edge of the collar, means for reciprocating and revolving the unitary reciprocable means, and intermittently operative means to move said second member, while within the can body, into contact engagement with the radially inner face of the collar.

58. A device for making cans including a rotatable mechanism having pockets for receiving a can body and collar, respectively, a guide member for the collar interposed between said pockets and adapted for rotation therewith, a structure reciprocable as a unit and including means adapted for inserting and fixedly securing the collar in the can body, said last mentioned means including a collar inserting mechanism and a spinning tool and mechanism to insert the spinning tool within the can body through the collar, the said last mentioned inclusive means being adapted for revolving as a unitary structure about an axis common to the means which carries the can and the collar; means to reciprocate and revolve said unitary structure, and intermittently operative means to move said spinning tool, while within the can body, into contact engagement with the radially inner face of the collar.

59. A device for making cans, including a rotatable mechanism for receiving a can body and collar, reciprocable means adapted for inserting and fixedly securing the collar in the can body, said last mentioned means being adapted for revolving about an axis common to the means which carries the can and the collar, and said reciprocable means including a collar inserting head and a member adapted for entering within the can body through the collar; means operative intermittently while the last mentioned member is within the can body for moving said member laterally relative to the can axis and into engagement with the radially inward face of the collar, and means for reciprocating and revolving said reciprocable means.

60. A device of the character described, including a rotatable mechanism for receiving a can body and open collar, said mechanism providing a station at which the can body and collar are revolved about a common axis, reciprocable means for inserting the collar in the can body, a pair of cooperative spinning tools, one of which is reciprocable in unison with the collar inserting means and is adapted for entering into the can body through the collar opening, means operative intermittently to move the spinning tool in the can laterally of the can axis, and means for causing relative rotation between the collared can body and the spinning tools, said last mentioned means and said collar inserting means and said spinning tools being operable while the can body and collar are axially aligned at a single station.

61. A device of the character described, including rotatable mechanism for receiving a can body and an open collar, said mechanism providing a station at which the can body and collar are revolved about a common axis, reciprocable means for inserting the collar in the can body, a pair of cooperatively disposed spinning tools, one of which is reciprocable in unison with the collar inserting means and is adapted for entering into the can body through the collar opening, means operative intermittently to move the spinning tool in the can laterally of the can axis, and means for causing relative rotation between the collared can body and spinning tools, said last mentioned means and said collar inserting means and said spinning tool being adapted for collar inserting means and is adapted for enterable while the can body and collar are axially aligned at a single station.

62. A device for making cans, including mechanism for receiving a tubular can body at a station, and mechanism for inserting a collar in said tubular can body and fixedly securing said collar in said tubular can body at said station, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, and said device including means to roll down a bead at the outer edge of the collar simultaneously with securing the collar to the can body.

63. A device for making cans, including mechanism for receiving a tubular can body and providing a movable station for said tubular can body, mechanism for inserting and fixedly securing a collar in said tubular can body at said station, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, and means to progressively advance the mechanism which provides said station, and said device including means to roll down a bead at the outer edge of the collar simultaneously with securing the collar to the can body.

64. A device for making cans including means for positioning a tubular can body and a collar in axial alignment and in spaced relation, mechanism operable at a single station for inserting the collar in the tubular can body and spinning said collar into intimate frictional contact with the inner wall of the tubular can body, said last mentioned mechanism including a pair of members one of which is adapted for engaging an outer edge of a collar and the other of which is adapted for entering into the can body through the collar and engaging the radially inner face of the collar in spaced relation to the axially outer edge of the collar, and said device including means to roll down a bead at the outer edge of the collar simultaneously with securing the collar to the can body.

65. A device for making cans including means for positioning a tubular can body and a collar in axial alignment, means for inserting a collar in said tubular can body, and for spinning said collar and body into fixed relationship one to the other, said inserting and spinning means being operable while the body and collar are axially aligned at a single station, said last mentioned means including a pair of members one of which is adapted for engaging an outer edge of a collar and the other of which is adapted for entering into the can body through the collar and engaging the radially inner face of the collar in spaced relation to the axially outer edge of the collar, and said device including means to roll down a bead at the outer edge of the collar simultaneously with securing the collar to the can body.

66. A device for making cans including means for positioning a tubular body and a collar in axial alignment, means for inserting a collar in said tubular body, and mechanism adapted for spinning said collar and body into fixed relationship one to the other, said last mentioned mechanism including a pair of members one of which is adapted for engaging an outer edge of a collar and the other of which is adapted for entering into the body through the collar and engaging the radially inner face of the collar in spaced relation to the axially outer edge of the collar, said collar inserting means and said spinning means being operable while the body and collar are axially aligned at a single station, and means to progressively advance said station while said collar inserting means and said spinning means are being operated, and said device including means to roll down a bead at the outer edge of the collar simultaneously with securing the collar to the can body.

67. A device for making cans, including mechanism to receive and support a can body at a station, means for inserting a collar into the can body at said station, means including an eccentric mechanism for spinning said collar and body into fixed relationship one to the other, said collar inserting means and said spinning means being operable while the body is at a single station, and said device including means to roll down a bead at the outer edge of the collar simultaneously with securing the collar to the can body.

68. A device for making cans, including rotatable mechanism to receive and support a can body and collar in substantial axial alignment, means adapted for inserting the collar in the can body and for fixedly securing the collar in the can body, said last mentioned means being operable as a unit and adapted to be revolved about an axis common to the rotatable mechanism which supports the can body and collar, and said last mentioned means including a pair of members one of which is adapted for engaging an outer edge of a collar and the other of which is adapted for entering into the can body through the collar and engaging the radially inner face of the collar in spaced relation to the axially outer edge of the collar, and said device including means to roll down a bead at the outer edge of the collar simultaneously with securing the collar to the can body.

69. A device for making cans including a rotatable mechanism having pockets for receiving a can body and collar, respectively, a guide member for the collar interposed between said pockets and adapted for rotation therewith, means adapted for inserting and fixedly securing the collar in the can body, said last mentioned means including a collar inserting mechanism and a spinning tool and means to insert the spinning tool within the can body through the collar, the said last mentioned inclusive means being adapted for revolving as a unitary structure about an axis common to the means which carries the can and the collar; and means to revolve said unitary structure, and said device including means to roll down a bead at the outer edge of the collar simultaneously with securing the collar to the can body.

70. A device for making cans, including a rotatable mechanism for receiving a can body and collar, means adapted for inserting and fixedly securing the collar in the can body, said last mentioned means including a reciprocable mechanism adapted for revolving about an axis common to the means which carries the can and the collar, and said reciprocable mechanism including a collar inserting head and a member adapted for entering within the can body; and means for moving the last mentioned member laterally relative to the can axis and into engagement with the radially inward face of the collar, and said device including means to roll down a bead at the outer edge of the collar simultaneously with securing the collar to the can body.

71. A device of the character described, including a rotatable mechanism for receiving a can body and open collar, said mechanism providing a station at which the can body and collar are revolved about a common axis, means for inserting the collar in the can body, a pair of cooperative spinning tools, one of which is adapted for entering into the can body through the collar opening, means to move the spinning tool in the can laterally of the can axis, and means for causing relative rotation between the collared can body and the spinning tools, said last mentioned means and said collar inserting means and said spinning tools being operable while the can body and collar are axially aligned at a single station, and said device including means to roll down a bead at the outer edge of the collar simultaneously with securing the collar to the can body.

72. A device of the character described, including rotatable mechanism for receiving a can body and an open collar, said mechanism providing a station at which the can body and collar are revolved about a common axis, means for inserting the collar in the can body, a pair of cooperatively disposed spinning tools, one of which is adapted for entering into the can body through the collar opening, means to move the spinning tool in the can laterally of the can axis, and means for causing relative rotation between the collared can body and spinning tools, said last mentioned means and said collar inserting means and said spinning tool being adapted for revolving about said common axis and being operable while the can body and collar are axially aligned at a single station, and said device including means to roll down a bead at the outer edge of the collar simultaneously with securing the collar to the can body.

73. In a can making apparatus which has means to receive and rotatively advance a can body and a collar in spaced relation, a reciprocable mechanism which includes a member adapted to insert the collar in the can body and a tool adapted for entering into the can body; means to move the last mentioned tool laterally of the axis of the can and into engagement with the radially inner face of the collar, and means whereby said collared can body and said tool within the can may be rotated, and said device including means to roll down a bead at the outer edge of the collar simultaneously with securing the collar to the can body.

74. A device for assembling the parts of cans, including mechanism for receiving and supporting the side wall portion of a can body at a station, a first means for positioning a member at an end portion of the side wall of the can body in contact with the periphery of the end portion of said side wall at said station, a second means operable laterally of the can body axis for pressing said member and the side wall of the can body into fixed relationship one to the other, said second means including an eccentric mechanism, said first means and said second means being operable while the can body is at a single station.

75. A device for making cans including means for positioning in axial alignment a collar and tubular can body having a circumferentially scored strip, means for inserting a collar in said tubular can body and for spinning said collar and body into fixed relationship one to the other, said inserting and spinning means being operable while the body and collar are axially aligned at a single station, said last mentioned means including a pair of reciprocable members one of which is adapted for inserting the collar into the can body in overlying relation to the scored strip, and the other of which includes a rotatably mounted head adapted for spinning the can body and collar into tightly fixed relationship at a portion in spaced relation to the axially outer edge of the collar and axially inwardly of the zone which overlies the scored strip.

76. In a can making apparatus which has a station to receive a tear strip can body and a collar, a reciprocable mechanism which includes a member adapted to insert the collar in the can body until the inner edge of the collar is beyond the tear strip, a tool adapted for entering into the can body through the collar, means for moving said tool into the can body, means intermittently operative to move the tool laterally of the axis of the can and into engagement with the portion of the radially inner face of the collar beyond the tear strip of the can body, means operable while the tool is in engagement with the collar for relatively rotating said collared can body and said tool, said collar inserting member and said means for moving the tool into the can body being operable while the can body and collar are at a single station.

ALBERT V. SULLIVAN.